Patented Dec. 11, 1951

2,578,475

UNITED STATES PATENT OFFICE 2,578,475

PRODUCTION OF GAS COMPRISING HYDROGEN AND CARBON MONOXIDE

Joel H. Hirsch, Oakmont, and Maurice J. Boegel, Penn Township, Allegheny County, Pa., assignors to Gulf Research & Development Company, Pittsburgh, Pa., a corporation of Delaware No Drawing. Application May 9, 1949,
Serial No. 92,252

3 Claims. (Cl. 48—196)

This invention relates to a process for carrying out reactions between hydrocarbons and oxygen at an advanced temperature. More particularly, the invention relates to a process for producing a gas comprising hydrogen and carbon monoxide, i. e., a synthesis gas, by partially reacting hydrocarbons with oxygen in an internal combustion engine.

In one method of operating a Fischer-Tropsch synthesis converter, it is necessary to continuously supply synthesis gas comprising hydrogen and carbon monoxide having a uniform high ratio of hydrogen to carbon monoxide and containing as small an amount of diluents as possible. The present invention is concerned with the production of a gas adapted for use in this method by the reaction between oxygen and hydrocarbons such as methane, natural gas, refinery gases, or other mixtures of readily available hydrocarbons.

In accordance with the invention excellent yields of a gas comprising hydrogen and carbon monoxide having a high hydrogen to carbon monoxide ratio, such as a ratio of 1.60:1 and above, are obtained in a simple and efficient manner. The process of the invention is carried out in a spark ignition engine provided with a cylinder and a piston and utilizes a charge mixture to the engine consisting essentially of oxygen and a fuel consisting of a mixture of hydrocarbons, especially such a mixture in which the atomic ratio of hydrogen to carbon is in the range of 3.5:1 to 4.0:1, particularly 3.65:1 to 3.85:1. We have found that ordinary natural gas is an excellent example of a suitable fuel. The process of the invention broadly comprises operating such an engine while using as the charge mixture oxygen and a fuel as described in which the mol ratio of oxygen to fuel is within the range of 0.75:1 to 0.9:1 and characteristic of the point of incipient misfire of the engine at the existing compression pressure, and igniting the charge mixture in the cylinder before top dead center of piston travel. Under these conditions the exhaust gases obtained after expansion and concomitant cooling contain hydrogen and carbon monoxide in a high ratio making them especially useful as raw materials for the synthesis of higher hydrocarbons.

We have discovered in accordance with the invention that in order to obtain optimum results involving the production of gases containing hydrogen and carbon monoxide in a ratio of 1.60:1 and above, it is important to proceed as described below. For most effective operation, careful control of the relation between the three conditions, the compression pressure (i. e., the pressure at top dead center of piston travel in the absence of an explosion), the mol ratio of oxygen to fuel, and the point of ignition in the cycle, is important. We have also found that the compression temperature (i. e., the temperature at top dead center of piston travel in the absence of an explosion) should be at least 1000° F., although under ordinary conditions of operation no precautions need be taken in this connection as the compression temperature in a given engine is a function of the compression pressure. In practicing the present process in a preferred manner, two of the above three conditions should be fixed and the other adjusted to cause the engine to operate substantially at the point of incipient misfire. We have discovered that when igniting the charge mixture prior to top dead center of piston travel, to obtain best results, the relation between compression pressure and oxygen to fuel ratio should be maintained within definite limits. Thus, we have found that the compression pressure in pounds per square inch gauge should not exceed the pressure determined by the following equation:

$$P = \frac{43.8}{R^{4.34}}$$

and should not be lower than the pressure determined by the equation $$P = \frac{52.5}{R^{3.13}}$$

In these equations P represents the compression pressure and R represents the oxygen to fuel mol ratio.

The product mixture produced upon ignition of the charge mixture at the point of incipient misfire has a high hydrogen to carbon monoxide ratio and is obtained at an elevated reactive temperature of the order of 2500° to 3500° F. In accordance with the invention, this product mixture is expanded in the cylinder against the piston while doing work and is further expanded by opening the exhaust valve and permitting the mixture to reach the back pressure of the system which is preferably about atmospheric pressure. This reduces the pressure on the product mixture and quickly cools it to a non-reactive temperature below 1300° F. where further changes in the composition of the mixture are inhibited. The cooled mixture is then recovered and is available for use in hydrocarbon synthesis processes.

As stated above, the fuel employed in the present process should have an atomic ratio of hydrogen to carbon of 3.5:1 to 4.0:1, and preferably 3.65:1 to 3.85:1. We have found that by using fuels having atomic ratios of hydrogen to carbon within these ranges, better results are obtained from fuels having the higher hydrogen to carbon ratios by adjusting the compression pressure of the engine so that it falls within the upper portion of the range defined by the above equations, and conversely, fuels having low hydrogen to carbon ratios produce better results when using an engine having a compression pressure falling within the lower portion of the range.

It will be understood that charge mixtures containing oxygen and fuel in a range of ratios from 0.75:1 to 0.90:1 do not produce the same results in each instance. Low ratios within this range result in increased yields of hydrogen and carbon monoxide per mol of oxygen and in higher ratios of hydrogen to carbon monoxide in the product gas. Accordingly, for maximum yields of hydrogen and carbon monoxide and maximum ratios of hydrogen to carbon monoxide, we prefer to adjust the compression pressure of the engine to employ a charge mixture having a low ratio of oxygen to fuel. However, because extremely rich charge mixtures are often difficult to ignite, we prefer to employ as the charge mixture a mixture in which the mol ratio of oxygen to fuel is between about 0.75:1 and 0.85:1.

The importance of maintaining the relation between the compression pressure and the oxygen to fuel ratio within the limits defined by the two equations given previously is brought out by a consideration of the following facts determined in the experimental work leading to the development of the present invention. If the compression pressure is greater than that indicated by the equation, $$P = \frac{43.8}{R^{4.84}}$$

or is lower than that indicated by the equation, $$P = \frac{52.5}{R^{3.13}}$$

the ratio of hydrogen to carbon monoxide and the yield of hydrogen and carbon monoxide per mol of oxygen are reduced. In the first case, the engine will be producing excess power which is not a principal objective of the present process and in the second case, the engine will be misfiring causing non-uniform burning of the charge mixture.

As will be understood by those skilled in the art, there are several factors requiring consideration in order to obtain the desired compression pressure. These factors include the compression ratio of the internal combustion engine employed, the intake manifold pressure and the temperature at which the charge mixture is introduced into the engine cylinder.

The efficiency of ignition of the charge mixture has an effect upon results obtained in practicing the present process. The mixture should be ignited so that burning is accomplished rapidly and uniformly. Depending upon the cross-sectional area of the engine cylinder and also to some extent upon the homogeneity of the charge mixture, one or a plurality of spark plugs may be employed for igniting the charge mixture. We have found, for example, for charge mixtures having a ratio of oxygen to fuel less than 0.90:1, that when using an engine having a cylinder 3.25 inches in diameter, the use of two spark plugs rather than one makes possible obtaining effective results with compression pressures in the lower range of the pressures indicated by the above equations.

In the following example the process of the invention is illustrated in a four-cycle engine. This example is given for the purpose of illustration only and not for the purpose of limiting the spirit or scope of the invention. For example, it will be understood that the process of the invention can be applied in other type engines, such as in a two-cycle engine.

*Example*

A mixture of oxygen and natural gas, having a mol ratio of oxygen to natural gas of about 0.90:1, the natural gas having an atomic ratio of hydrogen to carbon of 3.75:1, is introduced at room temperature and at an intake manifold pressure of about 16 inches of mercury absolute into the cylinder of an engine which is being motored. The engine is a four-cycle, water-cooled, spark ignition, internal combustion engine having a cylinder diameter of 3.25 inches and a compression ratio of 6.5:1.

The ignition is turned on and when the engine begins to fire, motoring is discontinued. The intake manifold pressure, and thus the compression pressure, is gradually increased until the engine reaches the normal operating level by increasing the amounts of oxygen and natural gas charged to the engine. At the same time, the ratio of oxygen to natural gas is maintained at or slightly higher than the charge ratio for incipient misfire. When the engine reaches the normal operating level, the ignition timing, and spark plug gap and intensity are adjusted to give maximum power. The ignition timing is then retarded about 10 crank angle degrees from the setting for maximum power, being set in this case 58 crank angle degrees before top dead center. After the adjustments, the starting up procedure is repeated. When the normal operating level is reached, an intake manifold pressure of about 28 inches of mercury absolute, a compression pressure of 129 pounds per square inch, results at a mol ratio of oxygen to natural gas of about 0.80:1.

The charge mixture is then spark ignited 58° before top dead center by the spark plug, producing a resulting mixture having a high uniform ratio of hydrogen to carbon monoxide at a pressure of about 535 pounds per square inch and a temperature of about 3200° F.

The resulting mixture is expanded during the power stroke of the cylinder to a pressure of about 40 pounds per square inch at a temperature of about 1650° F., the exhaust valve is opened, and the gas is further expanded to the back pressure of the system, namely atmospheric pressure, causing a temperature drop to about 1300° F. The gas of the desired composition is discharged during the exhaust stroke of the piston. The gas has the following composition:

| Component: | Mol per cent |
| --- | --- |
| Carbon dioxide | 2.8 |
| Oxygen | 1.1 |
| Carbon monoxide | 30.8 |
| Hydrogen | 49.3 |
| Methane | 1.6 |
| Nitrogen | 1.4 |
| Water | 13.1 |

The natural gas having a hydrogen to carbon ratio of 3.75:1, introduced with oxygen into an engine in a ratio of oxygen to natural gas of 0.80:1 and at a compression pressure of 129 pounds per square inch gauge produced a gas with a ratio of hydrogen and carbon monoxide to oxygen of 3.10:1, the ratio of hydrogen to carbon monoxide being 1.60:1.

Additional runs were carried out on the spark ignition engine employed in the example with both single and dual ignition. A mixture of oxygen and the natural gas was fed to the engine under varying conditions. The results of a number of these runs are compiled in the following table. The data for the example are included in the table for comparative purposes under run A.

Table

| Run | A | B | C | D | E | F | G |
|---|---|---|---|---|---|---|---|
| No. of Spark Plugs | 1 | 1 | 1 | 2 | 2 | 1 | 1 |
| Compression Ratio | 6.5 | 4 | 6.5 | 6.5 | 6.5 | 4 | 6.5 |
| Hydrogen/Carbon in Natural Gas, Atomic Ratio | 3.75 | 3.75 | 3.75 | 3.75 | 3.75 | 3.75 | 3.75 |
| Oxygen/Natural Gas, Mol Ratio | 0.80 | 0.90 | 0.82 | 0.78 | 0.75 | 1.06 | 0.90 |
| Intake Manifold Pressure, Inches of Mercury, Absolute | 28.1 | 31.4 | 23.7 | 31.3 | 28.3 | 16.3 | 16.0 |
| Intake Manifold Temperature, °F | 105 | 95 | 100 | 310 | 90 | 82 | 80 |
| Compression Pressure, p. s. i. g | 129 | 73 | 106 | 145 | 129 | 31 | 67 |
| Exhaust Gas Composition, Wet Basis, Mol Per Cent: | | | | | | | |
| Carbon Dioxide | 2.8 | 3.1 | 2.8 | 2.4 | 2.5 | 4.1 | 3.4 |
| Oxygen | 1.1 | 1.1 | 0.9 | 0.4 | 1.1 | 1.0 | 1.2 |
| Carbon Monoxide | 30.8 | 30.6 | 30.7 | 31.6 | 30.8 | 29.5 | 29.7 |
| Hydrogen | 49.3 | 49.0 | 49.0 | 52.1 | 53.0 | 41.7 | 45.3 |
| Methane | 1.6 | 0.9 | 1.5 | 1.7 | 2.2 | 0.7 | 1.5 |
| Nitrogen | 1.4 | 1.7 | 1.9 | 0.6 | 1.3 | 2.7 | 2.8 |
| Water | 13.1 | 13.6 | 13.2 | 11.2 | 9.0 | 20.3 | 16.1 |
| Hydrogen/Carbon Monoxide, Mol Ratio | 1.60 | 1.60 | 1.60 | 1.65 | 1.72 | 1.39 | 1.52 |
| Hydrogen plus Carbon Monoxide/Oxygen, Mol Ratio | 3.10 | 3.02 | 3.10 | 3.44 | 3.56 | 2.37 | 2.73 |

The data in the table illustrate the advantages of operating in accordance with the invention. It will be noted that in run F, which was carried out under conditions outside the scope of this invention, the oxygen to fuel ratio was greater than 0.90:1 and the compression pressure was outside the range of compression pressures as determined by the equations given above. It will also be noted that the hydrogen to carbon monoxide mol ratio in the exhaust gas was low, 1.39:1, and the ratio of mols of hydrogen plus mols of carbon monoxide produced per mol of oxygen in the charge mixture was low. Thus, the exhaust gas did not have the composition desired for use in synthesis reactions, and the consumption of oxygen in relation to the hydrogen and carbon monoxide produced was excessive. Also, although run G produced superior results to those of run F, here also the hydrogen to carbon monoxide ratio of the exhaust gas was low, and the consumption of oxygen in relation to the production of hydrogen and carbon monoxide was high. It will be noted that the compression pressure for the charge mixture of this run (oxygen to fuel mol ratio=0.90) called for by the equations given previously is 73 pounds per square inch gauge, whereas the actual compression pressure was 67 pounds per square inch.

As indicated previously, the compression pressure may be increased by increasing either or both the intake manifold pressure and the compression ratio. The intake manifold pressure may be varied by varying the pressure at which the oxygen or mixture of hydrocarbons is introduced or by increasing the pressure of the mixture by the use of a supercharger or other similar means.

Obviously many modifications and variations of the invention as hereinabove set forth may be made without departing from the spirit and scope thereof and therefore only such limitations should be imposed as are indicated in the appended claims.

We claim:

1. A process of producing in a spark ignition internal combustion engine provided with a cylinder and piston a gas comprising hydrogen and carbon monoxide with a high hydrogen to carbon monoxide ratio, which comprises introducing into said cylinder a preformed charge mixture of oxygen and a hydrocarbon fuel in which the atomic ratio of hydrogen to carbon is in the range of 3.50:1 to 4.0:1, said charge mixture containing said oxygen and said fuel in a mol ratio in the range of 0.75:1 to 0.90:1, compressing said charge mixture in said cylinder by the piston under conditions adapted to produce a compression pressure not in excess of the pressure determined by the equation, $$P = \frac{43.8}{R^{4.34}}$$

and not lower than the pressure determined by the equation, $$P = \frac{52.5}{R^{5.13}}$$

where P is the compression pressure in pounds per square inch gauge and R is the mol ratio of oxygen to fuel in the charge mixture, spark igniting said charge mixture prior to top dead center of piston travel to produce a resulting mixture comprising hydrogen and carbon monoxide at an elevated pressure and an elevated reactive temperature, expanding said resulting mixture to reduce the pressure on said resulting mixture and to cool said resulting mixture, and recovering an exhaust gas comprising hydrogen and carbon monoxide having a high hydrogen to carbon monoxide ratio.

2. A process of producing in a spark ignition internal combustion engine provided with a cylinder and piston a gas comprising hydrogen and carbon monoxide with a high hydrogen to carbon monoxide ratio, which comprises introducing into said cylinder a preformed charge mixture of oxygen and a natural gas in which the atomic ratio of hydrogen to carbon is in the range of 3.65:1 to 3.85:1, said charge mixture containing said oxygen and said natural gas in a mol ratio in the range of 0.75:1 to 0.90:1, compressing said charge mixture in said cylinder by the piston under conditions adapted to produce a compression pressure not in excess of the pressure determined by the equation, $$P = \frac{43.8}{R^{4.54}}$$

and not lower than the pressure determined by the equation, $$P = \frac{52.5}{R^{3.13}}$$

where P is the compression pressure in pounds per square inch gauge and R is the mol ratio of oxygen to natural gas in the charge mixture, spark igniting said charge mixture prior to top dead center of piston travel to produce a resulting mixture comprising hydrogen and carbon monoxide at an elevated pressure and an elevated reactive temperature, expanding said resulting mixture and to cool said resulting mixture, and recovering an exhaust gas comprising hydrogen and carbon monoxide having a high hydrogen to carbon monoxide ratio.

3. A process of producing in a spark ignition internal combustion engine provided with a cylinder and piston a gas comprising hydrogen and carbon monoxide with a hydrogen to carbon monoxide mol ratio of at least 1.60:1, which comprises introducing into said cylinder a preformed charge mixture of oxygen and a natural gas in which the atomic ratio of hydrogen to carbon is about 3.75:1, said charge mixture containing said oxygen and said natural gas in a mol ratio in the range of 0.75:1 to 0.85:1, compressing said charge mixture in said cylinder by the piston under conditions adapted to produce a compression pressure not in excess of the pressure determined by the equation, $$P = \frac{43.8}{R^{4.54}}$$

and not lower than the pressure determined by the equation, $$P = \frac{52.5}{R^{3.13}}$$

where P is the compression pressure in pounds per square inch gauge and R is the mol ratio of oxygen to natural gas in the charge mixture, spark igniting said charge mixture prior to top dead center of piston travel to produce a resulting mixture comprising hydrogen and carbon monoxide at an elevated pressure and an elevated reactive temperature, expanding said resulting mixture to reduce the pressure on said resulting mixture and to cool said resulting mixture, and recovering an exhaust gas comprising hydrogen and carbon monoxide having a hydrogen to carbon monoxide mol ratio of at least 1.60:1.

JOEL H. HIRSCH.
MAURICE J. BOEGEL.

REFERENCES CITED

The following references are of record in the file of this patent:

UNITED STATES PATENTS

| Number | Name | Date |
|---|---|---|
| 1,107,581 | Brownlee et al. | Aug. 18, 1914 |
| 1,107,582 | Brownlee et al. | Aug. 18, 1914 |
| 2,363,708 | Urquhart | Nov. 28, 1944 |
| 2,376,479 | Fehling | May 22, 1945 |
| 2,484,249 | Ruble | Oct. 11, 1949 |

FOREIGN PATENTS

| Number | Country | Date |
|---|---|---|
| 479,518 | Great Britain | Feb. 3, 1938 |